US007756821B2

(12) United States Patent
Havens et al.

(10) Patent No.: US 7,756,821 B2
(45) Date of Patent: Jul. 13, 2010

(54) VIRTUAL DELETION IN MERGED FILE SYSTEM DIRECTORIES

(75) Inventors: Jeffrey L. Havens, Issaquah, WA (US); Frederick J. Smith, Redmond, WA (US); Yousef A. Khalidi, Bellevue, WA (US); Madhusudhan Talluri, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 215 days.

(21) Appl. No.: 11/555,745

(22) Filed: Nov. 2, 2006

(65) Prior Publication Data

US 2008/0109394 A1    May 8, 2008

(51) Int. Cl.
*G06F 7/00* (2006.01)
(52) U.S. Cl. .................... 707/600; 707/745; 707/822
(58) Field of Classification Search .................. None
See application file for complete search history.

(56) References Cited

U.S. PATENT DOCUMENTS

| | | | | |
|---|---|---|---|---|
| 5,778,389 | A * | 7/1998 | Pruett et al. .................. 1/1 |
| 5,806,065 | A * | 9/1998 | Lomet ........................ 707/8 |
| 5,909,689 | A | 6/1999 | Van Ryzin .................. 707/203 |
| 5,978,892 | A * | 11/1999 | Noel et al. .................. 711/170 |
| 6,098,072 | A | 8/2000 | Sluiman et al. ............. 707/103 |
| 6,199,082 | B1 * | 3/2001 | Ferrel et al. ................ 715/205 |
| 6,374,286 | B1 * | 4/2002 | Gee et al. ................... 718/108 |
| 6,418,484 | B1 | 7/2002 | Radia ......................... 709/316 |
| 7,036,043 | B2 | 4/2006 | Martin et al. |
| 7,080,104 | B2 * | 7/2006 | Ring et al. .................... 1/1 |
| 7,389,512 | B2 * | 6/2008 | Tucker ....................... 719/313 |
| 7,599,906 | B2 * | 10/2009 | Kashiwagi et al. ............ 1/1 |
| 2003/0110188 | A1 | 6/2003 | Howard et al. .............. 707/200 |
| 2003/0131253 | A1 * | 7/2003 | Martin et al. ............... 713/200 |
| 2003/0156822 | A1 | 8/2003 | Um et al. ..................... 386/52 |
| 2004/0208489 | A1 | 10/2004 | Moon et al. .................. 386/96 |
| 2004/0236763 | A1 | 11/2004 | Krishnamoorthy et al. .. 707/100 |
| 2006/0195449 | A1 * | 8/2006 | Hunter et al. .................. 707/9 |

(Continued)

FOREIGN PATENT DOCUMENTS

WO    WO 2005/033944    4/2005

(Continued)

OTHER PUBLICATIONS

Page, Jr. T.W. et al., "Management of Replicated Volume Location Data in the Ficus Replicated File System", *Proceedings of the Summer USENIX Conference*, Jun. 1991, http://www.isi.edu/people/johnh/PAPERS/Page91b.pdf, 17-29.

(Continued)

*Primary Examiner*—Tim T. Vo
*Assistant Examiner*—Hasanul Mobin
(74) *Attorney, Agent, or Firm*—Woodcock Washburn LLP

(57) ABSTRACT

An element of a file system is virtually deleted by creating a deletion marker for the element. Two or more separate physical file system directories are presented as one merged (virtual) file system directory to a process running in a silo. The operating system provides the merged view of the file system directories by monitoring file system requests made by processes in silos on a computer or computer system and filtering out those elements associated with deletion markers. Special processing is invoked in response to detecting certain types of file system access requests, including: enumeration, open, create, rename or delete.

20 Claims, 7 Drawing Sheets

U.S. PATENT DOCUMENTS

2006/0248128 A1* 11/2006 Acharya et al. ............ 707/203
2007/0239744 A1* 10/2007 Bruno et al. ................ 707/101

FOREIGN PATENT DOCUMENTS

WO    WO 2006/051037 A1    5/2006

OTHER PUBLICATIONS

Santry, D.S. et al., "Deciding when to forget in the Elephant File System", *SOSP,* 1999, http://delivery.acm.org, 110-123.

Wright, C.P. et al., "Versatility and Unix Semantics in Namespace Unification", *ACM Transactions on Storage,* 2006, 2(1), 74-105.

Antonopoulos, A.M., "Creating an Identity Layer with Directory Virtualization," *Network World,* Jun. 14, 2005, 6 pages, downloaded at http://www.networkworld.com/newsletters/datacenter/2005/0613datacenter1.html.

PCT International Search Report mailed May 28, 2008, in corresponding International Application No. PCT/US2007/081882.

* cited by examiner

VIRTUAL DELETION IN MERGED FILE SYSTEM DIRECTORIES

BACKGROUND

At times it may be desirable to allow applications running on a computer or computer system to share some files while restricting access to other files. For example, all the applications running on a particular machine may need to share files one through ten but perhaps only application A should have access to file eleven and only application B should have access to files twelve and thirteen. One way to accomplish this is to make several sets of the files all the applications need. That is, a first set of files might include a copy of files one through ten and file eleven for use by application A. A second set of files might include a copy of files one through ten and files twelve and thirteen for use by application B. One immediately obvious disadvantage to this approach is the additional storage space required for maintaining separate sets of files. Duplicative requirements for other system resources such as memory and paging space may also result from this approach. Another disadvantage to this approach is that when a file needs to be modified, it must be modified in both sets of files (e.g., if a new version of file one becomes available, file one in both sets of files would have to be updated).

It may be also sometimes be desirable to allow different access levels to different parts of the file system. For example, it may be desirable to allow application A to delete file one but not to allow application B to delete file one. Embodiments of the invention address these and other needs.

SUMMARY

Two or more separate physical file system directories are presented as a single (virtual) merged file system directory to an application running in a controlled execution environment called a silo. All of the operations normally available to be performed on a file system directory may be able to be performed on the merged directory, however, the operating system may control the level of access to the files in the merged directory. The operating system provides the merged view of the file system directories by monitoring file system requests made by processes in silos on a computer or computer system and in response to detecting certain types of file system access requests, provides the view of the seemingly merged directories by performing special processing. Examples of types of changes or requests which trigger the special processing include enumeration, open, create, rename, close or delete. The state required to create the merged view is not stored on permanent media.

A need for virtual deletion of a file, directory or subdirectory may become necessary or desirable in circumstances including the following:

- The user who makes the request to delete the file has permission to delete the file based on the ACL (access control list) associated with the file.
- The private contributing directory of the merged directory has delete permission for the file to be virtually deleted via its access mask.
- Delete semantic support is enabled for the merged directory in which the file for which the delete request is received exists.

When all of the above conditions are met, a delete marker is created in the private directory for the file being virtually deleted. From the silo's point of view, a file so marked is deleted. Hence special processing for virtual deletion may be required when certain types of file system operations are requested. The types of requests which trigger the special deletion processing include enumeration, open, create, rename, and delete.

DETAILED DESCRIPTION

Overview

Figure 1:
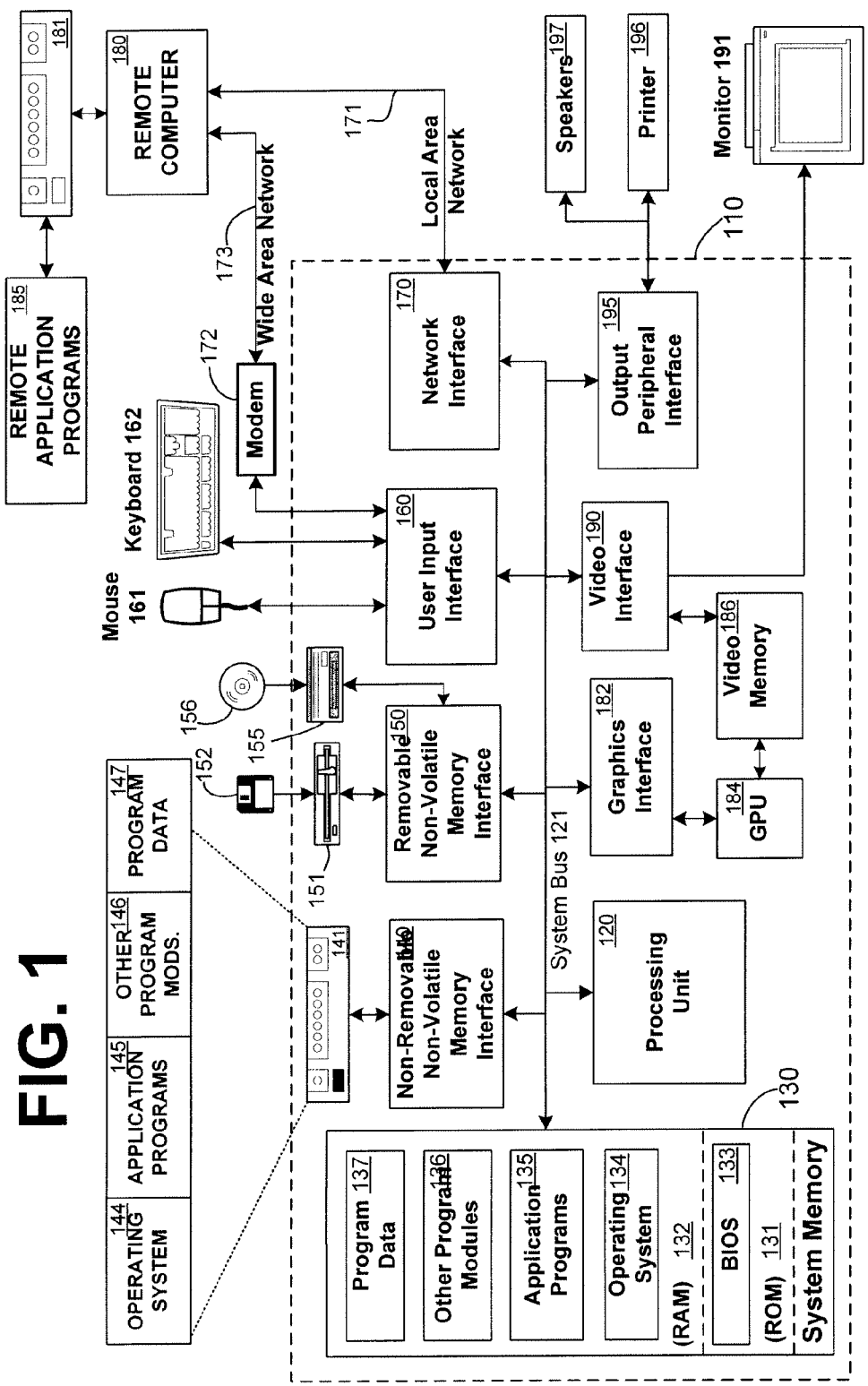
FIG. 1 is a block diagram illustrating an exemplary computing environment in which aspects of the invention may be implemented.

Ideally, an operating system would be able to control the sharing of files and would be able to control the level of access to files at an application level. For example, it may be useful for an operating system to be able to allow application A read only access to files one through ten and read-write access to file eleven, while allowing application B read only access to files one through ten and read-write access to files twelve and thirteen. Typically, however, current known operating systems provide all processes running under the same user account with the same level of access to the same set of files. Thus, in the example described above, if the same user initiated applications one and two, in order to allow application A to write to file eleven and application B to write to files twelve and thirteen, application A would also have read-write access to files twelve and thirteen and application B would have read-write access to file eleven.

Thus, in many systems, limited points of containment in the system exist at the operating system process level and at the machine boundary of the operating system itself, but in between these levels, security controls such as Access Control Lists (ACLs) and privileges associated with the identity of the user running the application are used to control process access to files. Because access to system resources is associated with the identity of the user running the application rather than with the application itself, the application may have access to files that the application does not need, as demonstrated by the example above. Because multiple applications may be able to modify the same file, incompatibility between applications can result. Security problems may also arise, as one application may maliciously or accidentally interfere with the operation of another application.

An intra-operating system isolation/containment mechanism called herein a silo provides for the grouping and isolation of processes running on a single computer using a single instance of the operating system. A single instance of the operating system divides the processing space for the system into multiple side-by-side and/or nested execution environments (silos) enabling the controlled sharing of some files and restriction of access to other files. The operating system controls file sharing and access by creating different views of the file system for each silo. The view appears to processes running in the silo to be a single directory which is the union of at least parts of two or more physical file system directories. That is, the files available to an application depend on which silo the application is running in and the file system that an application running in a silo "sees" is created by apparently merging two or more file system directories or portions of file system directories. The single OS image serving the computer or computer system thus provides a different view of the file system so as to control which process, group of processes, application or group of applications can use which files(s) and how the files can be used. Access to files and the degree of access to accessible files is therefore directly associated with or based on the silo that the process, application, group of processes or group of applications is placed in and is not solely or primarily determined by user privileges.

When two or more physical directories are exposed via one logical view, deleting a file may expose or unhide a file that has the same name as the deleted file in one of the other contributing directories. Typically in a merged directory scenario, the contributing directories are ranked. When a collision occurs (that is, a file with the same name exists in two or more of the contributing directories), the ranking policy determines which file will be exposed. However, if the highest ranked file has been deleted, the file with the same name from the contributing directory will be exposed, absent intervention. Exposure of that file may not be desired. Hence, there is a need to "remember" that a file with the same name existed in a contributing directory and prevent exposure of that file when the highest ranked file of the same name has been deleted.

To address the above need, delete markers are associated with a file for which a delete request has been received in the merged directory environment. When a merged directory is exposed, typically there will be a private portion of the merged directory which is writable and a public portion (made up of one or more public directories) which are read-only. Both the private directory and the public directory or directories contribute to the logical merged directory. New files and potentially modifiable files (via copy-on-write operations, for example) typically go into the private portion of the merged directory. The files in the public portion of the merged directory are typically visible but are not modifiable. A file created in the private directory with the same name as a file or files in a contributing public directory or directories will typically mask or hide the public files because a private file outranks a similarly-named public file. But if the private highest-ranking file is deleted, one of the public files may be unhidden or exposed, because now the public file is the highest ranking file of that name. To an application that previously accessed the private file, the private file will not appear to have been deleted. An application that had previously accessed the private file may now access the previously hidden but now exposed file instead, which to the application's knowledge, is the same file, although the content of the previously hidden file may well be different. Furthermore, further attempts to delete the file will fail because the file now being opened is in a read-only location. This is problematic.

To address these problems, a marker is added to the private directory to indicate that the file marked is to be considered "deleted" and therefore should no longer be visible via the logical merged directory view. Hence, in embodiments of the invention, storage for the delete markers is provided and delete markers are created and honored during file access operations. Storing the delete markers requires some sort of persistent storage for the delete information. Hence, deletion data may indicate the name of the file, directory or sub-directory deleted and the location from which the file, directory or sub-directory is deleted. These objectives may be realized by storing a special file which identifies the deleted file, directory or sub-directory, storing another file system marker such as a re-parse point for the deleted file, directory, or sub-directory, storing another stream or an extended attribute with a deleted file, directory or sub-directory and storing the delete data in an external (separate) store. Because a deletion may occur within a transaction, any implementation used may be transaction-aware. In some WINDOWS operating systems the file system is transactional, meaning that a number of file system operations can be done together as a group. When all of the operations have been completed, the changes can either be committed or aborted. Hence either all the changes appear, or none appear. Hence, if delete markers are created as part of a transaction, the delete markers do not appear until the transaction is committed, and if the transactions are aborted, the delete markers disappear as well.

Creating a delete marker is required when a file, directory or sub-directory is virtually deleted from a merged directory. Honoring a delete marker is required when a request to open a file, directory or sub-directory is received for a file, directory or sub-directory previously deleted from a merge directory, when a request to enumerate a file, directory or sub-directory is received for a file, directory or sub-directory previously deleted from a merge directory, when a request to create a file, directory or sub-directory is received for a file, directory or sub-directory previously deleted from a merge directory and so on.

In some embodiments of the invention, when a file, directory or sub-directory is deleted, a file, directory or sub-directory with the same name will never again be exposed from a contributing directory other than the private portion of the merged directory. In this case, if a file, directory or sub-directory from a contributing (public) directory with the same name subsequently came into existence, that file, directory or sub-directory would not be visible in the merged directory. In some embodiments of the invention, a marker is only created if a file, directory or sub-directory of the same name as the file, directory or sub-directory being deleted exists in the public portion of the merged directory. In this case, deleting the private file, directory or sub-directory would otherwise result in exposing or unhiding the public file, directory or sub-directory of the same name. Should a file, directory or sub-directory of the same name subsequently come into existence, that file, directory or sub-directory would be visible in the merged directory.

Exemplary Computing Environment

FIG. 1 and the following discussion are intended to provide a brief general description of a suitable computing environment in which the invention may be implemented. It should be understood, however, that handheld, portable, and other computing devices of all kinds are contemplated for use in connection with the present invention. While a general purpose computer is described below, this is but one example, and the present invention requires only a thin client having network server interoperability and interaction. Thus, the present invention may be implemented in an environment of networked hosted services in which very little or minimal client resources are implicated, e.g., a networked environment in which the client device serves merely as a browser or interface to the World Wide Web.

Although not required, the invention can be implemented via an application programming interface (API), for use by a developer, and/or included within the network browsing software which will be described in the general context of computer-executable instructions, such as program modules, being executed by one or more computers, such as client workstations, servers, or other devices. Generally, program modules include routines, programs, objects, components, data structures and the like that perform particular tasks or implement particular abstract data types. Typically, the functionality of the program modules may be combined or distributed as desired in various embodiments. Moreover, those skilled in the art will appreciate that the invention may be practiced with other computer system configurations. Other well known computing systems, environments, and/or configurations that may be suitable for use with the invention include, but are not limited to, personal computers (PCs), automated teller machines, server computers, hand-held or laptop devices, multi-processor systems, microprocessor-based systems, programmable consumer electronics, network PCs, minicomputers, mainframe computers, and the like. The invention may also be practiced in distributed computing environments where tasks are performed by remote processing devices that are linked through a communications network or other data transmission medium. In a distributed computing environment, program modules may be located in both local and remote computer storage media including memory storage devices.

FIG. 1 thus illustrates an example of a suitable computing system environment 100 in which the invention may be implemented, although as made clear above, the computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1 provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB).

A monitor 191 or other type of display device is also connected to the system bus 121 via an interface, such as a video interface 190. A graphics interface 182, such as Northbridge, may also be connected to the system bus 121. Northbridge is a chipset that communicates with the CPU, or host processing unit 120, and assumes responsibility for accelerated graphics port (AGP) communications. One or more graphics processing units (GPUs) 184 may communicate with graphics interface 182. In this regard, GPUs 184 generally include on-chip memory storage, such as register storage and GPUs 184 communicate with a video memory 186. GPUs 184, however, are but one example of a coprocessor and thus a variety of coprocessing devices may be included in computer 110. A monitor 191 or other type of display device is also connected to the system bus 121 via an interface, such as a video interface 190, which may in turn communicate with video memory 186. In addition to monitor 191, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

One of ordinary skill in the art can appreciate that a computer 110 or other client device can be deployed as part of a computer network. In this regard, the present invention pertains to any computer system having any number of memory or storage units, and any number of applications and processes occurring across any number of storage units or volumes. The present invention may apply to an environment with server computers and client computers deployed in a network environment, having remote or local storage. The present invention may also apply to a standalone computing device, having programming language functionality, interpretation and execution capabilities.

Virtual Deletion in Merged File System Directories

The operating system monitors file system access requests made by a process running in a silo. Multiple silos may exist on the computer or in the computer system at the same time. Multiple processes may execute within each silo. A single operating system image creates the silos and creates and monitors all the processes in all the silos. A silo-specific view of a file system directory is created by the operating system by an apparent merging of two or more physical backing stores (file directories) together into what appears to the silo to be a single directory. That is, two or more separate file system directories may be exposed to a silo (and the processes running within the silo) as a single directory. One or more of the physical backing stores may be used to build a portion of the silo-specific view for one or more of the silos.

Figure 2:
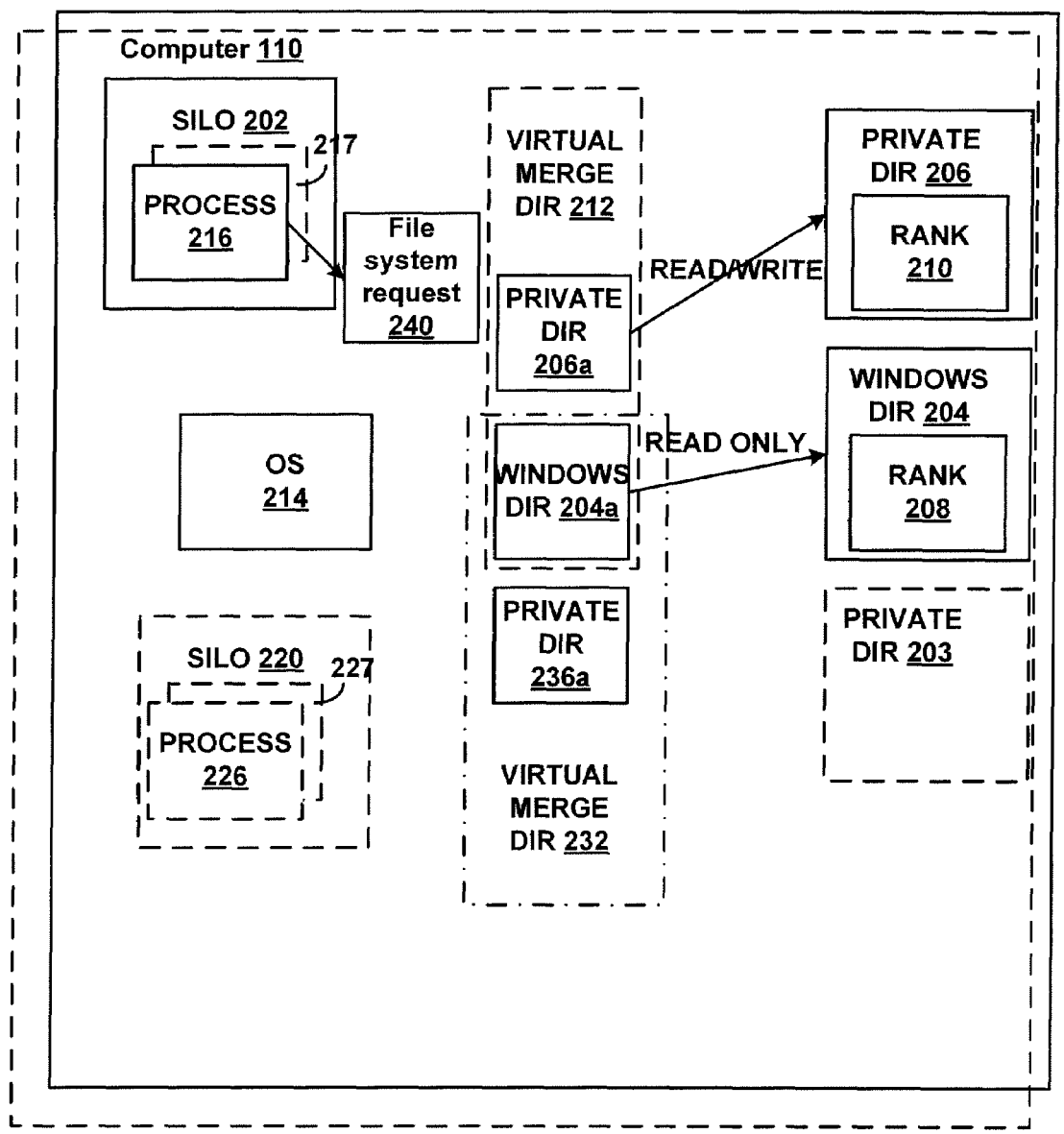
FIG. 2 is a block diagram of a system for virtual deletion of files in a merged file system directory in accordance with some embodiments of the invention.

FIG. 2 illustrates one embodiment of a system 200 for deletion of files, directories and sub-directories in a merged file system directory as described above. System 200 may reside on one or more computers such as computer 110 described above with respect to FIG. 1. In FIG. 2, one or more execution environments may be running on computer 110. One type of execution environment contemplated is a silo, (described more fully above). In FIG. 2, silo 202 and silo 220 are depicted. Silos may be nested, that is, silo 202 may itself include a silo (not shown). Silos may be nested to any desired level. A silo nested inside another silo is sometimes referred to as a child silo, and the silo in which it is nested is sometimes referred to as its parent silo. A parent silo may control the degree to which its resources (including files) are available to its child silos.

A silo may be used to create an isolated execution environment so that resources associated with one silo are available to processes running within that silo but are not accessible to other silos running on the computer or on other computers in the computer system or computer network. For example, if silo 202 were an isolated execution environment a resource (not shown) available to process 216 running in silo 202 would be unavailable to a process such as process 226 running in a second silo, silo 220. A second process running in silo 202 (such as process 217) would however, have access to that resource. Similarly a resource available to processes 226 and 227 would be unavailable to processes 216 and 217 running in silo 202.

Alternatively, in accordance with embodiments of the invention, a silo may be used to create a semi-isolated or controlled execution environment in which some resources are shared and some resources are not shared or in which some portions of a resource are shared and other portions of the resource are not shared. One such contemplated resource is the file system directory. For example, in silo 202 one or more processes such as process 216 and 217 may be running and have access to a file system directory. In some embodiments of the invention, the file system directory is a virtual merged directory 212, wherein the virtual merged directory 212, although appearing to processes 216 and 217 as a single physical directory is actually a virtual view of the union of two or more directories created by the operating system using callbacks to perform special processing for certain types of operations under certain circumstances. The view created by the operating system 214 may comprise the union of the entries of at least one (physical) public or global (to the computer system) shareable directory and at least one (physical) private or local (to the silo) directory merged together to create the virtual merged directory, although the invention as contemplate is not so limited. A merged directory may be built up from any combination of two or more public or private directories, one or more of which is designated as read-only or read-write. Furthermore, no public backing store may exist for one or more of the contributing directories. For example, the shareable portion of the virtual merged directory created by the operating system in some embodiments of the invention is a global directory (e.g., a WINDOWS directory) while a private, unshared portion of the virtual merged directory is associated with a particular silo (e.g., with silo 202), and may represent, for example, local or private files for applications running in that silo. For example, in FIG. 2, a virtual merged directory 212 associated with silo 202 includes a shareable portion 204a derived from a global directory (e.g., a public or global WINDOWS directory 204) and an unshareable portion 206a derived from a local directory (e.g., a private, unshared directory 206 associated with silo 202). A virtual merged directory 232 associated with silo 220 includes a shareable portion 204a derived from a global directory (e.g., a public or global WINDOWS directory 204) and an unshareable portion 236a derived from a local directory (e.g., a private, unshared directory 203 associated with silo 220). In some embodiments of the invention, the shareable portion 204a of the virtual merged directory 212 is read-only while the private, unshared portion 206a of the virtual merged directory 212 is read-write, although it will be appreciated that the contemplated invention is not so limited. That is, the private portion of the virtual merged directory may be read-only or read-write or may include portions which are read-only or read-write. Similarly, the shareable portion of the virtual merged directory may be read-only or read-write or may include portions which are only read-only or read-write. Moreover, it will be appreciated that the invention as contemplated is not limited to merging two directories. Any number of directories (n directories) may be merged to create the virtual merged directory. The virtual merged directory in some embodiments of the invention is not persisted on permanent storage or created per se in memory but is dynamically deduced by the operating system 214 as required, by monitoring file access requests and performing special processing associated with the type of file access request as described more fully below.

Thus, it will be appreciated that as more than one silo may exist on a computer or in a computer system at one time, more than one virtual merged directory may also exist at one time, that is, there is a one-to-one correspondence between silo and virtual merged directory but any number of silos and merged directories may exist at any one time on a particular computer or computer system. Moreover, a portion of each virtual merged directory may include a shareable portion (e.g., in FIG. 2, the shareable portion of the virtual merged directories 212 and 232 is the WINDOWS directory 204a) which may or may not be the same for all silos in the computer system and may or may not be identical to physical backing directory 204. In some embodiments of the invention, all of the applications or processes running within all the silos in the system share a single shareable portion of the silo's merged directory which may or may not exist on the particular computer on which the silo is running. Moreover, the physical directory which "backs" a shareable or unshareable portion of the merged directory may exist on removable media, such as a removable disk, CD ROM, USB key, etc. Similarly, the physical backing directory may reside on a remote system. The same is true for the private or unshareable portion of the merged directory and its backing store.

In some embodiments of the invention, the mechanism in the operating system 214 which creates the merged directories (e.g., merged directories 212 and 232) is a filter driver which is able to insert itself into the code paths of operations by registering callbacks. In some embodiments of the invention, the filter drivers comprise a part of the file system. In some embodiments of the invention, the callbacks registered for include PreCreate, PostCreate, PreDirectoryControl, PreQueryInformation, PreSetInformation, PreClose and SetInformation, although it will be appreciated that other callbacks may be registered. In some embodiments of the invention, the operations for which special processing (e.g., via callbacks) is performed are enumeration, open, create, rename, close and delete operations for files, directories and sub-directories. For example, an enumeration operation may be associated with PreDirectoryControl and PreQueryInformation callbacks, open and create with PreCreate and PostCreate callbacks, close with a PreClose callback, delete with a SetInformation callback and rename with a PreSetInformation callback. In some embodiments, when a file system access request is sent from a process, the operating system monitors the request via the callbacks and if the operation is one of those for which special processing is to occur, performs the special processing. For example, in FIG. 2 operating system 214 may monitor file system access requests such as request 240 initiated by process 216 in silo 202 and perform special processing to create virtual merged directory 212 from private directory 206 (associated with silo 202) and public directory 204. The portions of virtual merged directory 212 deriving from private directory 206 are represented by (virtual) private directory 206a and the portions of virtual merged directory 212 deriving from public directory 204 are represented by (virtual) public directory 204a.

Each of the contributing (backing store) directories may be associated with a rank, (e.g, in FIG. 2 private (backing store) directory 206 is associated with rank 210, public WINDOWS (backing store) directory 204 is associated with rank 208). Rank in some embodiments is used as a tie breaker when required. For example, if a directory file access (e.g. open, enumerate, delete, etc.) is requested, and the indicated file exists in both directories under the same name, the rank of the contributing directory may be used to determine which file is exposed to the requester, that is, the file in the directory having the highest rank is exposed to the requester. Similarly, if a given name is a file in one contributing directory and the same name is a sub-directory in another contributing directory, the entry in the directory having the highest rank is exposed to the requester in some embodiments. In some embodiments of the invention, the private directory 206 is given a higher rank than the public directory 204.

For example, a file system enumeration in some embodiments is the union of all the files and subdirectories from all the contributing directories. If the same name exists in more than one of the contributing directories, the rank of each of the contributing directories is used to determine which directory's version of the name should be exposed. When opening a file from within a merge directory, the file is opened from the highest rank directory exposing the file. When creating a file, if the file does not already exist in any of the contributing directories it will be created in the directory with the highest rank. When renaming a file, each of the contributing directories is queried to determine that the new name is not already in use, and if it is not, then the file will be renamed to the new name.

In some embodiments of the invention, instead of associating a rank with a directory, each file within each directory is associated with a rank that determines which file is exposed to the silo when more than one file or directory has the same name in contributing directories.

As described above, when two or more physical directories are exposed via one logical view, deleting a file may expose or unhide a file that has the same name as the deleted file in one of the other contributing directories. If, for example, the highest ranked file has been deleted, a file with the same name from a contributing directory may be exposed. Exposure of that file may not be desired. Hence, there is a need to "remember" that a file with the same name existed in a contributing directory and prevent exposure of that file when the highest ranked file of the same name has been deleted because otherwise, the private file will not appear to have been deleted to an application that previously accessed the private file.

To address the above need, delete markers are associated with a file for which a delete request has been received in the merged directory environment. In some embodiments, a marker is added to the private directory to indicate that the file marked is to be considered "deleted" and therefore should no longer be visible via the logical merged directory view. Hence, in embodiments of the invention, storage for the delete markers is provided and delete markers are created and honored during file access operations. Storing the delete markers requires some type of persistent storage for the delete information. A number of options for storing delete markers are contemplated. One option is to decorate or message the name of the deleted file to indicate deletion. For example, suppose a file "ABC.txt" is to be virtually deleted. ABC.txt may be virtually deleted by creating a file called "$$deleted$$ ABC.txt" (the original name to which has been added a decoration comprising "$$deleted$$ "). Presence of the appropriate decoration indicates a virtually deleted file. It will be apparent that any type of decoration may indicate a virtual deletion: the decoration shown is merely an example of one possible decoration. Another option is storing the delete marker as a reparse point. That is, the file system may store a "name entry" which is not a direct pointer to a file but instead is file data stored by a filter driver used to determine when to reparse to another location. In some embodiments, a third party can provide its own reparse points. A reparse point structure is provided and when detected, is treated as a delete marker (as is done with the specially named files). Reparse points may be filtered out of the results returned in response to an enumeration request. Another option is storing the delete marker in an external database. For example, a delete marker such as the name of the file, a decorated name or reparse point could be stored in another location in the file system (perhaps in a file, directory, or sub-directory called "Deleted Files") or delete markers could be stored in another non-file system store. In this case, instead of storing a decorated name to indicate a virtually deleted file, the name of the deleted file would be stored, requiring a lookup operation to determine if a given file was virtually deleted. Another option is using extended attributes to indicate that a file has been deleted. That is, a special extended attribute may be stored with the file name (e.g., instead of decorating the file name), the special extended attribute indicating that the file has been virtually deleted. Hence, deletion data may indicate the name of the file, directory or sub-directory deleted and the location from which the file, directory or sub-directory is deleted. These objectives may be realized by storing a special file which identifies the deleted file, directory or sub-directory storing another file system marker such as a re-parse point for the deleted file, directory, or sub-directory, storing another stream or an extended attribute with a deleted file, directory or sub-directory and storing the delete data in an external (separate) store. Because a deletion may occur within a transaction, any implementation used should be transaction-aware. For example, if the delete markers are stored in an external store, the external store would need to know when a transaction is being committed, and would commit the results to the external store during the transaction commit. Similarly, if the transaction were aborted, the external store would roll back (or undo) changes. It would also have to provide a view within a transaction that the action had already occurred, but outside the transaction make it appear as if the action had not yet occurred.

Creating a delete marker is required when a file is deleted from a merged directory. Honoring a delete marker is required when a request to open a file is received for a file previously deleted from a merge directory, when a request to enumerate a file is received for a file previously deleted from a merge directory, when a request to create a file is received for a file previously deleted from a merge directory and so on.

In some embodiments of the invention, when a file is deleted, a file with the same name will never again be exposed from a contributing directory other than the private portion of the merged directory. In this case, if a file from a contributing (public) directory with the same name subsequently came into existence, that file would not be visible in the merged directory. In some embodiments of the invention, a marker is only created if a file of the same name as the file being deleted exists in the public portion of the merged directory. In this case, deleting the private file would otherwise result in exposing or unhiding the public file of the same name. Should a file of the same name subsequently come into existence, that file would be visible in the merged directory.

In some embodiments of the invention, the filter driver of the operating system hooks various file system operations and in cooperation with the merged directory operations described above, exposes the correct semantics for the virtually deleted files, directories and sub-directories. For example, with respect to an operation such as an enumeration operation (for example, using PreDirectoryControl) deletion markers themselves are hidden and any files, directories or sub-directories which have been virtually deleted are hidden. That is, delete markers may be filtered out so that the delete markers are not returned when an enumeration request is received. Similarly, files for which a delete marker exists are not returned in response to the enumeration request. For an operation such as create or open (for example, using PreCreate) a caller is prevented from opening a delete marker or a virtually deleted file, directory or sub-directory. In a merged directory environment, logic is provided when an open or create operation request is received to determine whether to try to open the file, directory or sub-directory in the private or public portion of the merged directory. If the file, directory or sub-directory specified in the open is in the public portion, a check is performed to determine if a delete marker for that file, directory or sub-directory exists in the private location. If it does, the open fails (for example returning "status object name not found"). A file that has the form of a delete marker is not allowed to be opened. For a rename operation, renaming a file to a name in the form of a delete marker is not permitted. For a delete operation, a delete marker is created for the file, directory or sub-directory in the private portion of the merged directory. Delete markers in some embodiments of the invention are created by creating a new file with a messaged version of the file name. (For example, if the name of the file is ABC, if ABC is to be virtually deleted, a file named $$deleted$$ ABC is created. The presence of the file $$deleted$$ ABC indicates that ABC has been virtually deleted. Traditionally, before a directory or sub-directory can be deleted, the directory or sub-directory must be empty. In the case of a directory or sub-directory virtual deletion, a directory with only delete markers in it can be deleted. In some embodiments of the invention, this is implemented as follows: the delete marker for the directory is created, the nested delete markers are deleted and then the directory is deleted as usual.

Figure 3:
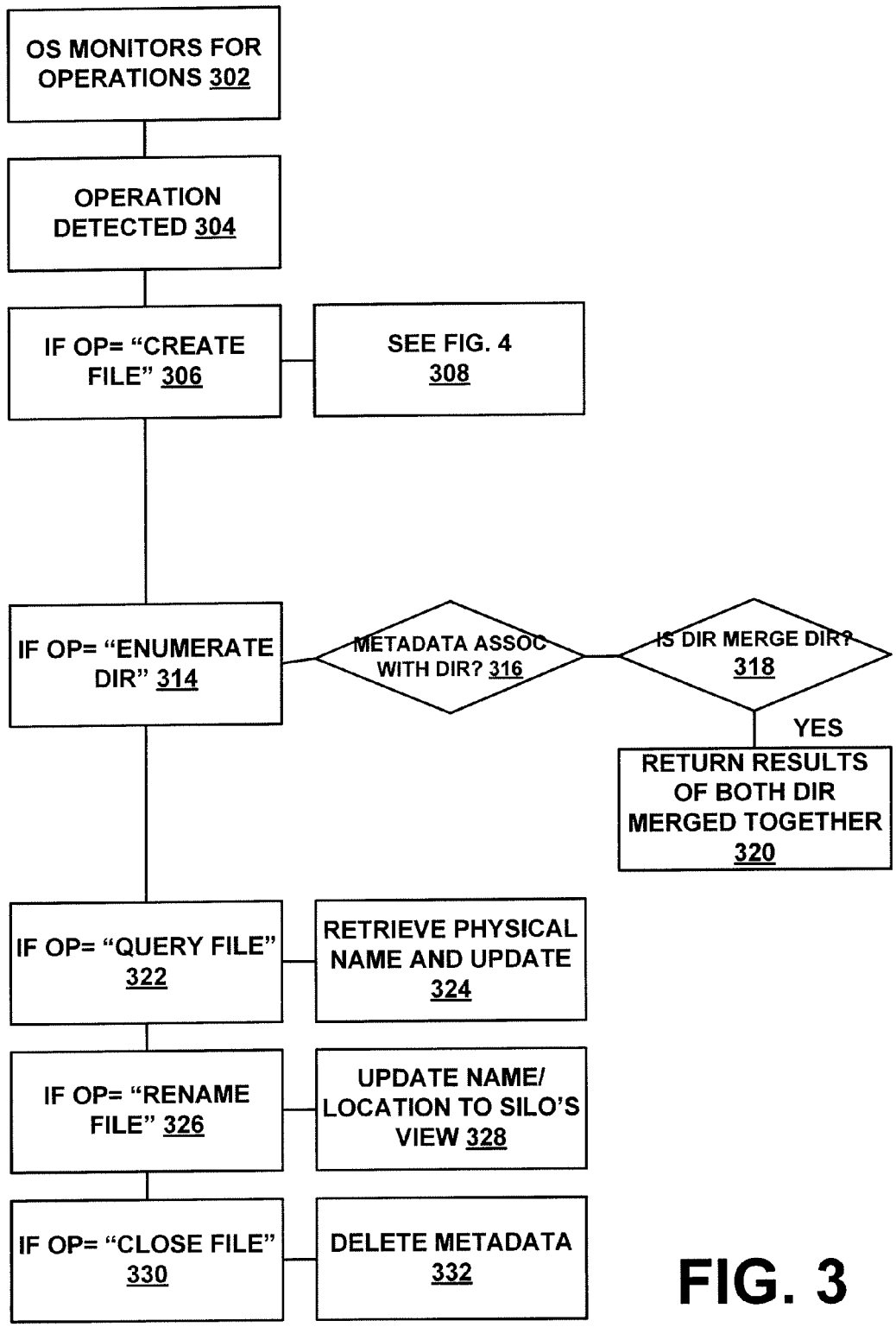
FIG. 3 is a flow diagram of a method for merging file system directories in accordance with some embodiments of the invention.

FIG. 3 is a flow diagram of a method for seemingly merging file system directories in accordance with embodiments of the invention. At 302 the operating system (e.g., OS 214 of FIG. 2) monitors file system access requests (such as file system access request 240 made by process 216 running in silo 202). When a file system access request is detected by the operating system (304) (e.g., via callbacks), the operating system 214 determines the type of file system access request made (306, 314, 322, 326, 330) and performs the appropriate processing as described more fully below.

Figure 4:
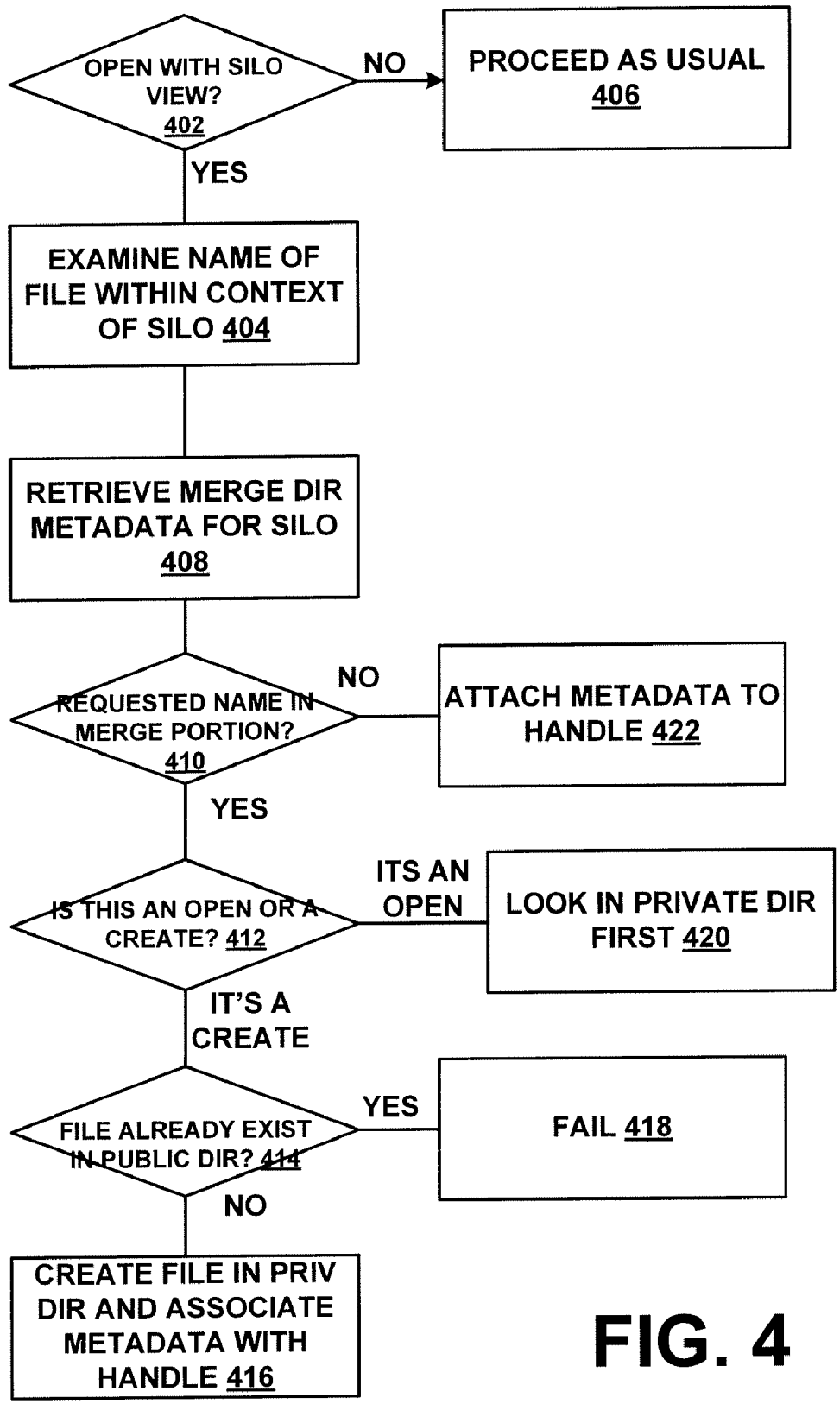
FIG. 4 is a flow diagram of a portion of the method of FIG. 3 in accordance with some embodiments of the invention.

For example, at 306, the operating system may determine that the file system access request is an operation that creates or opens a file or directory (306). FIG. 4 is a flow diagram of the processing (308) that may then occur. When an open or create interrupt request (IRP) is sent to a volume on which a merge directory exists, a create callback (e.g., PreCreate) is invoked which enables a filter driver of the operating system to examine the request to determine if special processing is required. Use of a filter driver enables implementation of the features described without modifying the underlying file system. Alternatively, creation of the merge directory may be created by modifying the underlying file system(s). When an open or create operation is invoked, an absolute path name or a path name relative to an existing open file or directory is provided. When a relative open is used, a field in the request packet representing the existing open file or directory references the file system device instance that should receive the request. In the case of an absolute open, the IO Manager of the operating system parses the name, the object manager resolves a portion of the name that leads to a device object and passes the unresolved balance of the name (the portion that has not yet been resolved) back to the I/O Manager, along with a pointer to the device object it located. Special processing is required when the file or directory referred to should be opened using the silo view (402) instead of using the normal system file directory. As used herein, performing an operation "using the silo view" means that the name of the file or directory is interpreted within the context of the silo's virtual merged directory instead of within the context of the normal (system) file system directory.

At 402, if the open is an absolute open (not a relative open) and the caller is in a silo processing continues at 404. In some embodiments of the invention, the operating system determines if the open or create file request is a relative or an absolute open/create by looking at several fields in the file system access request. If the file system access request includes only a file name, and the thread originating the request does not belong to a process running in a silo, the request is considered to be an absolute open. Similarly, when a process (in a silo or not in a silo) passes a handle to a file to another process, if the original handle was opened in a silo, processing continues at 404. The information stored in the handle field can be used to retrieve metadata associated with the handle (408).

Thus, at 404, the name of the file is examined within the context of the silo. The file or directory is opened using the silo view whenever the file or directory referenced in the request was originally opened within a silo (as, for example, may happen when a first process opens a file in a silo and then passes a handle to that file to another process inside or outside of a silo). In some embodiments of the invention, if a field in the request representing a handle to an existing open file or directory is not null, the request is considered to be a relative request. If, at 402, the caller is not in a silo or if the original handle was not opened in a silo, then processing proceeds as normal (406). If the request uses an absolute name (that is, names the file or directory explicitly using a path name and the open file field of the request is null), the operating system determines if the process initiating the request (the caller) is in a silo or not. In some embodiments of the invention, the operating system determines if the caller is in a silo by determining if the thread originating the file system access request is in a silo. Alternatively, in some embodiments the operating system may determine if the caller is in a silo by examining the file system access request which may be tagged with a silo identifier if the request originated from a caller in a silo. If the caller is in a silo, the file or directory is opened using the silo view.

Thus, if the file or directory referenced in the request was not originally opened in a silo, or if the request is an absolute open and the caller is not in a silo, processing continues at 406. That is, normal processing proceeds. In normal processing in some embodiments of the invention, the I/O Manager examines the device object to determine if the device object has a valid pointer to a volume parameter block (VPB) and uses the DeviceObject field of the VPB to find the correct file system device object. If the device object does not have a valid VPB pointer, the I/O Manager sends the IRP_MJ_CREATE request directly to the device driver for the device object passed in by the object manager.

At 404, if the operation is to be processed using the silo view, the name of the file or directory in the request is examined and is interpreted within the context of the silo. Suppose for example, "File1" exists in both a global directory (e.g. the shareable portion of the merge directory view) and a private directory (e.g., the portion which is not shareable with other silos). Suppose an application running in a silo requests to open "File1" using a relative open. Suppose that File1 is to be opened relative to "C:\WINDOWS" opened within a silo, where "C:\WINDOWS" is actually "C:\Silos\0000\WINDOWS". In this case the request would be re-written so that the File1 in the private directory (e.g. "C:\Silos\0000\WINDOWS" would be referenced, not the File1 in the global directory. Normal error processing occurs. That is, if, for example, in an open operation, the file identified by the name in the file system access request is searched for but is not found in any of the target directories, an error message is returned. If a file is found in an appropriate directory, a handle to the file is returned to the caller. Metadata may be attached to the handle before it is returned to the caller for a successful open or create. If the file is not found, an error message is returned. At 408 the merge directory metadata for the silo is retrieved. At 410 if the requested name is not found in the private portion of the merge directory, processing continues at 422. At 422 other directories (such as the public location) may be examined for the file. If the request is a create request, the file may be created in the merge location. If the request is successful, metadata is attached to the request so that future requests on the handle are properly processed. At 410, if the requested name is found in the merge directory, it is determined whether the named file is to be created or opened (412). In some operating systems the "create operation" can be used both to open and to create files. If this is the case, step 412 is required. If the requested operation is an "open file" at 420, the operating system determines if the file exists in the private (unshareable portion) of the merge directory. At 420 if the operating system determines that the file does not exist in the private portion of the virtual merge file directory, the public portion of the merge directory is examined for the file. If the file does not exist in the public portion of the merge directory, an error message is returned. If the file is found in the merge directory, the handle to the file is returned. If at 412 it is determined that the file is to be created, at 414, the operating system checks to see if the file already exists in the public or private directory. If it does, an error results (418). If it does not, the file is created in the private directory, metadata is associated with the handle (416) and the handle is returned to the caller, along with the metadata.

For example, suppose that process 216 in silo 202 issues a file system request 240. Suppose further that file system request 240 is a create file request (in WINDOWS, this may entail sending an IRP_MJ_CREATE IRP to the volume on which the merge directory exists). The PreCreate callback is called when the IRP_MJ_CREATE IRP is sent. Because the callback is made, a filter driver in OS 214 is able to examine the request and determine if special handling is required for this particular create operation. If the file should be accessed using a silo virtual view (a merge directory), special handling is required. If it is not, no special handling is required. If special handling is required, the merge directory metadata for the particular silo is retrieved. In some operating systems, a "create" operation may be used to open a file or to create a new file. If the disposition of the create statement indicates that a file is to be created, the operating system checks to see if the file already exists in the public contributing directory (e.g., WINDOWS directory 204). (That would be an error condition and appropriate error processing would ensue.) If the disposition of the create statement indicates that an existing file is to be opened, the operating system checks to see if the file exists in the private directory 206. If the file is found, then the request continues down the stack along with the location of the existing file. If an existing version of the file is not found, the location from which to perform the open is changed to the other contributing directory (to directory 204) and the request continues down the stack. Alternatively, the request may be reparsed by reissuing the request at the top of the stack. If the file name being accessed is not within a merge directory, processing proceeds as normal. If any special handling of the request was performed, metadata is associated with the file handle. This metadata can be accessed if further operations on the file are performed (such as for example a request to query the file name or an attempt to open another file relative to an open directory. In some embodiments of the invention, the metadata will be attached to the file handle during PostCreate.

Referring again to FIG. 3, if the operating system detects an enumeration request for a file system directory at 314, first, the operating system determines if there is metadata associated with the directory (316). In some embodiments of the invention, if metadata is present, the directory is a merge directory (318). Alternatively, the operating system can determine whether the directory is merge directory from the metadata. In either case, if the directory is a merge directory (318) the results of both directories merged together is returned. If the directory is not a merge directory, normal processing is performed. For example, if a directory enumeration IRP is initiated by a process such as process 216 of silo 202, the operating system checks to see if there is any metadata associated with the directory to enumerate (the directory named in the request). If there is metadata associated with the directory or if the operating system determines from the metadata that the directory is a merge directory (318), both directories are merged together and the results are returned to the caller. Thus, when an initial enumeration request is received, an enumeration of each of the contributing directories is performed and the results are stored in an enumeration cache. The caller's buffer is populated with the results of the enumeration by comparing the latest entry of each of the enumeration caches. If a cache becomes empty, an enumeration may be re-issued to that contributing directory to receive more results. If a contributing directory has no more results, other caches are pulled from. When all the caches are drained and none of the contributing directories have any more results, the enumeration is complete. Results may be stored in sorted order so that which cache to pull from can be determined (based on sort order). Alternatively, if the underlying file system does not enumerate results in sorted order, (as for example, is the case with some file systems such as but not limited to the File Allocation Table file system developed by Microsoft for MS-DOS and some versions of Microsoft WINDOWS) the cache is fully populated, and sorted before results are returned. If the same name is encountered in more than one directory, the rank of the contributing directory is used as the tie breaker (as described above).

If the operation is a query (322) (such as a request for the name or other information about the file) the physical name of the file is retrieved at 324 and the name is updated, if necessary, to reflect the proper name for the requester. In some instances, if a request for the name of a file is received or a request for other information about a file is received, the silo relative name rather than the physical name of the file on stable storage is returned. That is, if a request to receive file information is received, the information is returned by the operating system and any information is updated as required (328) so that it matched the name the caller used to open the file, thus maintaining the illusion that all of the contents of the contributing directories are in the same merge directory. For example, suppose a process inside a silo has passed a handle to a process outside the silo and that process now wants the name of the file, the name of the file that would be returned to the requestor would be the non-silo or system name of the file, not the silo name of the file. Similarly, if a process inside a silo had a handle to a system file, it would need the silo name of the file, not the system name of the file. Hence, given a handle, the name of the file that is appropriate for the requestor is returned.

If the operation encountered is a rename file (326) the operating system must ensure that the new name (the name to which the filed is going to be renamed), which is a silo-relative name is translated into a physical name before the underlying file system sees it so that the file system renames the file properly. If at 330 the operation is determined to be a close, the PreClose callback is invoked. At 332 any metadata associated with the file being closed is deleted. It will be appreciated that one or more of the above listed actions may be optional or skipped and that the actions may proceed in a sequence other than that depicted in FIG. 3.

Figure 5:
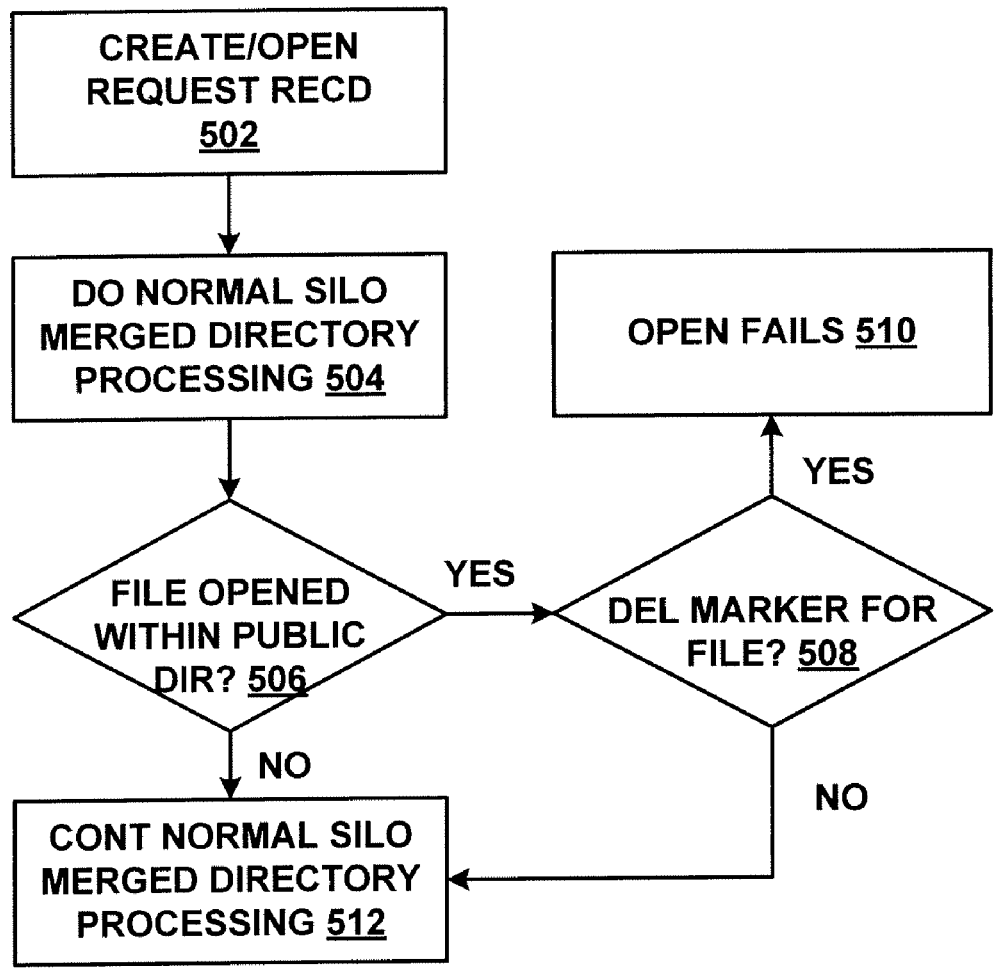
FIG. 5 is a flow diagram of virtual deletion processing for an open/create request in accordance with some embodiments of the invention.

FIG. 5 illustrates embodiments of an create/open operation honoring a virtual deletion. At 502 a create/open request for a file, directory or sub-directory is received. At 504 normal silo merged directory processing is performed as described above. At 506 it is determined if the file, directory or sub-directory being opened is within a public contributing directory or not. At 508, if the file being opened is located within the public portion of the merged directory, it is determined if there is a deletion marker for the file, directory, or sub-directory in question and if so at 510 the open request fails. If at 508 it is determined that there is no delete marker for the file, directory or sub-directory in question, normal silo merged directory processing is performed (512). If at 506 it is determined that the file, directory or sub-directory being opened is not within a public contributing directory processing continues at 512. A delete marker may be implemented in any suitable fashion, as described above.

Figure 6:
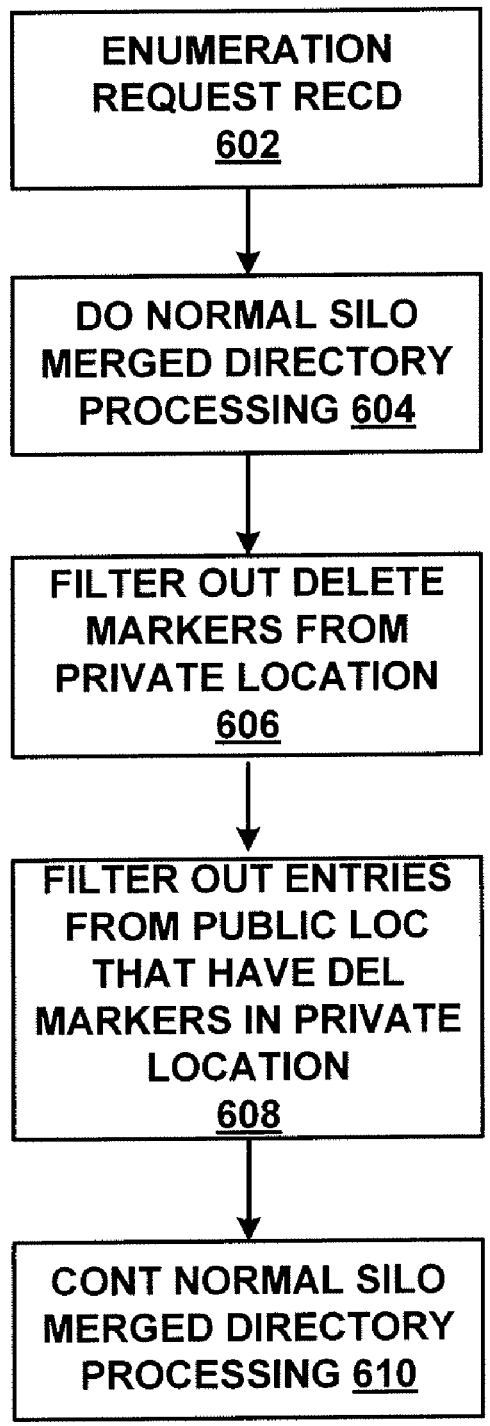
FIG. 6 is a flow diagram of virtual deletion processing for an enumeration request in accordance with some embodiments of the invention.

FIG. 6 illustrates some embodiments of an enumeration operation honoring a virtual deletion. At 602 an enumeration request for a file, directory or sub-directory is received. At 604 normal silo merged directory processing is performed as described above. At 606 deletion markers are filtered from the private location (private portion of the merged directory). At 608, entries in the public location which have corresponding delete markers in the private location are filtered out. At 610 normal silo merged directory processing is performed. In some embodiments of the invention, files for which a deletion marker exists are filtered out. The results are displayed or otherwise returned.

Figure 7:
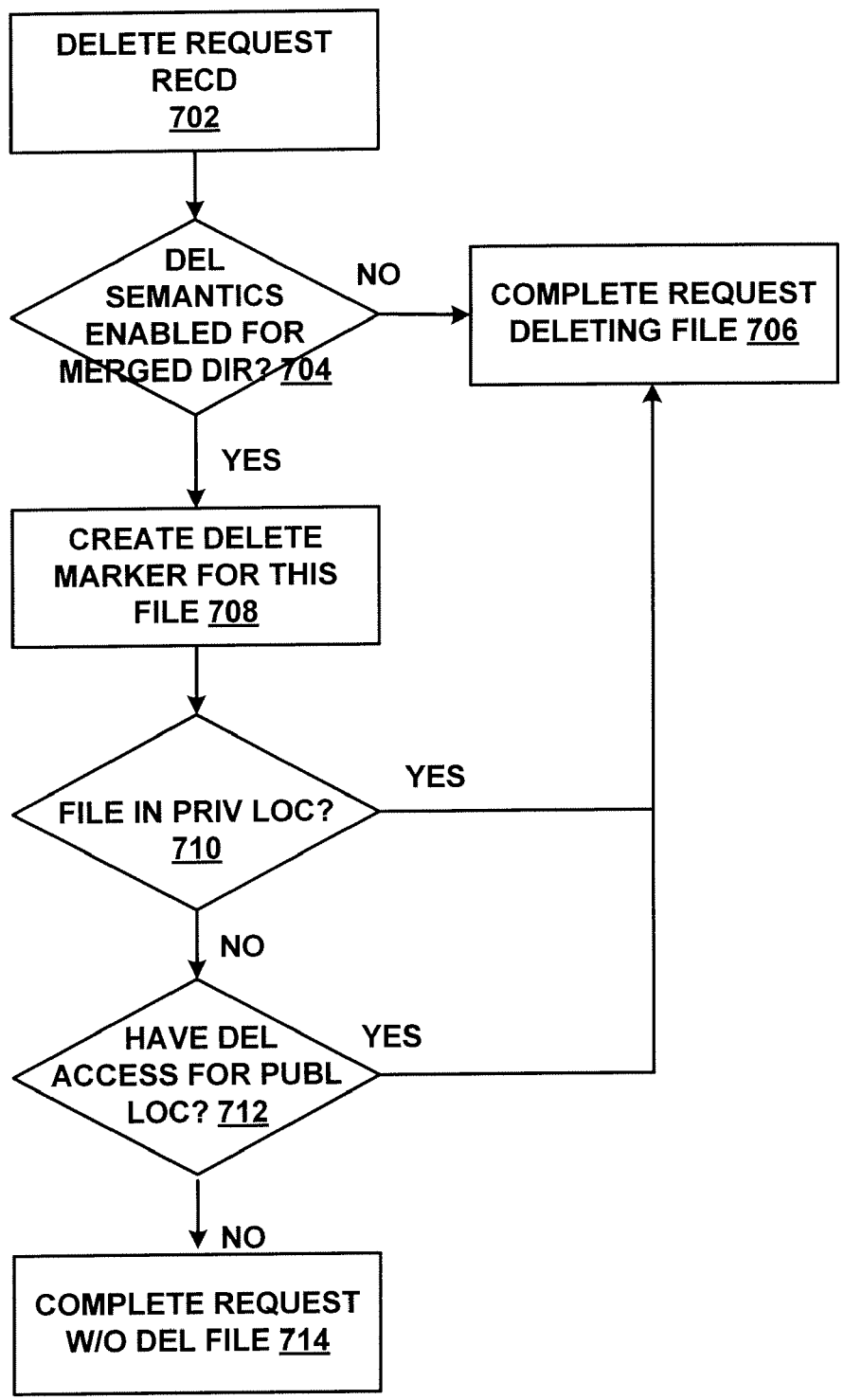
FIG. 7 is a flow diagram of virtual deletion processing for a delete request in accordance with some embodiments of the invention.

FIG. 7 illustrates some embodiments of a virtual deletion operation. At 702 a delete request for a file, directory or sub-directory is received. At 704 if virtual deletion semantics are not enabled for the merged directory, normal processing continues at 706. If, however, virtual deletion semantics are enabled for the merged directory, processing continues at 708 and a deletion marker is created for the file being deleted. At 710 if the file for which the deletion request is received is in a private location, the file is "deleted" (706). At 710 if the file for which the deletion request is in a public location, processing continues at 712. At 712, if the access permissions associated with the delete request allow it, the file is "deleted" (706). At 712 if the access permissions associated with the delete request do not allow it, the file is not deleted (714).

The various techniques described herein may be implemented in connection with hardware or software or, where appropriate, with a combination of both. Thus, the methods and apparatus of the present invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computing device will generally include a processor, a storage medium readable by the processor (including volatile and non-volatile memory and/or storage elements), at least one input device, and at least one output device. One or more programs that may utilize the creation and/or implementation of domain-specific programming models aspects of the present invention, e.g., through the use of a data processing API or the like, are preferably implemented in a high level procedural or object oriented programming language to communicate with a computer system. However, the program(s) can be implemented in assembly or machine language, if desired. In any case, the language may be a compiled or interpreted language, and combined with hardware implementations.

While the present invention has been described in connection with the preferred embodiments of the various figures, it is to be understood that other similar embodiments may be used or modifications and additions may be made to the described embodiments for performing the same function of the present invention without deviating therefrom. Therefore, the present invention should not be limited to any single embodiment, but rather should be construed in breadth and scope in accordance with the appended claims.

What is claimed:

1. A system for performing a virtual deletion of an element in a merged directory comprising:

a processor;

a memory coupled to said processor;

at least a portion of an operating system stored on said memory and configured to execute program code containing instructions that when executed by the processor:

divide processing space into a plurality of execution environments (silos);

provide a merged view of a plurality of file system directories comprising a private directory and at least one public directory for processes running in each of the plurality of silos, wherein each silo has a merged view that is specific to that silo, wherein access to the plurality of file system directories by the processes is based on the silo in which the processes are placed, wherein the program code causes the operating system to create the merged view specific to the silo by monitoring file system access requests initiating from the processes running in the silo and in response to detecting a file system deletion request, performs callback processing that creates a deletion marker for an element identified in the file system deletion request, wherein the element for which the deletion marker has been created is filtered from the merged view of the plurality of the file system directories that appears to the processes running in the silo as a single directory comprising entries in the plurality of file system directories, and wherein virtual deletion of the element identified in the deletion request in the private directory hides a same-named element in the at least one public directory.

2. The system of claim 1, wherein each of the plurality of file system directories is associated with a rank.

3. The system of claim 2, wherein the rank associated with each of the plurality of file system directories is used as a tiebreaker to determine entries included in the silo-specific view when more than one entry in the plurality of directories is known by a particular name.

4. The system of claim 1, wherein the operating system includes a filter driver that detects virtual deletions via callbacks inserted in file system access request processing paths comprising delete processing, enumeration processing, create processing, open processing and rename processing.

5. The system of claim 4, wherein the file system deletion request creates a deletion marker for the file system element identified in the file system deletion request.

6. A method for providing a view of a plurality of file system directories comprising a view of a virtual merged directory comprising a plurality of file system directories comprising a private directory and at least one public directory to processes running in a one of a plurality of execution environments contained within a single operating system environment (silo) comprising:

monitoring access requests made by processes running in the silo using a filter driver in an operating system, wherein access to the plurality of file system directories by the processes is based on the silo in which the processes are placed, wherein the filter driver detects virtual deletion of an element of a file system by presence of a deletion marker associated with the element;

in response to detecting the deletion marker, performing processing associated with a type of file access request wherein the element associated with the deletion marker is filtered from the view of the plurality of file system directories and hiding a same-named element as the element identified in the deletion request in the at least one public directory.

7. The method of claim 6, further comprising creating the deletion marker by decorating an identifier of the element with text indicating virtual deletion.

8. The method of claim 6, further comprising storing the deletion marker in an external file.

9. The method of claim 6, wherein in response to determining that the file access request is an enumerate file or enumerate directory operation, the operating system returns the view wherein the view comprises a list of entries in the first file directory and the second file directory except for entries associated with deletion markers.

10. The method of claim 6, wherein in response to determining that the file access request is an enumerate file or enumerate directory operation, the operating system returns the view wherein the view comprises a list of entries in the first file directory and the second file directory except for entries comprising deletion markers.

11. The method of claim 6, wherein a file access request that renames a file system element to a name indicating virtual deletion is prohibited.

12. The method of claim 6, wherein a file access request that attempts to open an element associated with a deletion marker fails.

13. The method of claim 6, wherein access of the process to entries in the second file directory is read-write access.

14. A computer-readable storage medium having program code stored thereon that, when executed by a computing environment, causes the computing environment to:
use a filter driver of an operating system to monitor processes running in one of a plurality of execution environments contained within a single operating system environment (silo), wherein the filter driver detects a file access request made by a process running in the silo;
in response to detecting the file access request, perform processing associated with a type of file access request wherein a view of a plurality of physical file directories is provided to the process, wherein the view presents the plurality of physical file directories comprising a private directory and at least one public directory to the process as a single merged virtual directory comprising entries of the plurality of physical file directories, wherein entries associated with deletion markers are eliminated from the view, wherein access to the plurality of physical file directories by the processes is based on the silo in which the processes are placed and hiding a same-named element as the element identified in the deletion request in the at least one public directory.

15. The computer-readable storage medium of claim 14, having further program code stored thereon, that when executed by the computing environment, causes the computing environment to:
associate a deletion marker with an element identified by a delete access request, wherein the deletion marker comprises a decorated element identifier.

16. The computer-readable storage medium of claim 14, having further program code stored thereon, that when executed by the computing environment, causes the computing environment to:
associate a deletion marker with an element identified by a delete access request, wherein the deletion marker is stored in an external datastore.

17. The computer-readable storage medium of claim 14, having further program code stored thereon, that when executed by the computing environment, causes the computing environment to:
associate a deletion marker with an element identified by a delete access request, wherein the deletion marker is stored in the file system.

18. The computer-readable storage medium of claim 15, having further program code stored thereon, that when executed by the computing environment, causes the computing environment to:
filter out elements associated with deletion markers when an enumerate request is received.

19. The computer-readable storage medium of claim 15, having further program code stored thereon, that when executed by the computing environment, causes the computing environment to:
prohibit renaming an element to a name indicating that the element has been deleted.

20. The method of claim 6, wherein access of the process to entries in the first file directory is restricted to read-only access via creation of the view.

* * * * *